(12) United States Patent
Chen et al.

(10) Patent No.: US 11,973,782 B2
(45) Date of Patent: Apr. 30, 2024

(54) COMPUTER-IMPLEMENTED METHOD, DEVICE, AND COMPUTER PROGRAM PRODUCT

(71) Applicant: Dell Products L.P., Round Rock, TX (US)

(72) Inventors: Qiang Chen, Shanghai (CN); Jiacheng Ni, Shanghai (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 299 days.

(21) Appl. No.: 17/666,776

(22) Filed: Feb. 8, 2022

(65) Prior Publication Data
US 2023/0231861 A1     Jul. 20, 2023

(30) Foreign Application Priority Data

Jan. 19, 2022    (CN) .............................. 202210061803

(51) Int. Cl.
*H04L 9/40*             (2022.01)

(52) U.S. Cl.
CPC ........ *H04L 63/1425* (2013.01); *H04L 63/102* (2013.01); *H04L 63/1416* (2013.01); *H04L 63/1466* (2013.01); *H04L 63/20* (2013.01)

(58) Field of Classification Search
CPC ............... H04L 63/1425; H04L 63/102; H04L 63/1416; H04L 63/1466; H04L 63/20
(Continued)

(56) References Cited

U.S. PATENT DOCUMENTS 8,554,703 B1    10/2013    Lin et al.
10,268,749 B1    4/2019    Roy et al.
(Continued)

OTHER PUBLICATIONS

K. Zhang et al., "Machine Learning-Based Temperature Prediction for Runtime Thermal Management Across System Components," IEEE Transactions on Parallel and Distributed Systems, Feb. 1, 2018, pp. 405-419, vol. 29, No. 2.
(Continued)

*Primary Examiner* — Frantz B Jean
(74) *Attorney, Agent, or Firm* — Ryan, Mason & Lewis, LLP

(57) ABSTRACT

Embodiments of the present disclosure relate to a computer-implemented method, device, and computer program product. The method includes: determining, based on a set of user behavior data over a first time period, a set of behavioral features for a user behavior over the first time period. The method further includes: determining, based on the set of behavioral features, a set of anomaly scores for the user behavior according to an anomaly detection model. The anomaly detection model is trained based on user behavior data over a second time period. The method further includes: updating a previously determined anomaly score threshold based on comparison of the determined set of anomaly scores with the anomaly score threshold. The anomaly score threshold is used for indicating whether the user behavior is anomalous. By continuously updating the anomaly score threshold, the solution uses the updated anomaly score threshold for anomaly detection of user behavior.

20 Claims, 8 Drawing Sheets

(58) Field of Classification Search
USPC .......................................................... 726/26
See application file for complete search history.

(56) References Cited

U.S. PATENT DOCUMENTS

| | | | |
|---|---|---|---|
| 10,698,766 B2 | 6/2020 | Zhao et al. | |
| 2008/0134347 A1 | 6/2008 | Goyal et al. | |
| 2010/0153785 A1 | 6/2010 | Keromytis et al. | |
| 2010/0235552 A1 | 9/2010 | Holden et al. | |
| 2010/0262579 A1 | 10/2010 | Brown et al. | |
| 2012/0284212 A1 | 11/2012 | Lin et al. | |
| 2012/0284213 A1 | 11/2012 | Lin et al. | |
| 2015/0128249 A1 | 5/2015 | Alexandrian et al. | |
| 2018/0300653 A1 | 10/2018 | Srinivasan et al. | |
| 2019/0385043 A1 | 12/2019 | Choudhary et al. | |
| 2020/0110591 A1 | 4/2020 | Buczkowski | |
| 2020/0249936 A1 | 8/2020 | Barfield, Jr. | |
| 2020/0296124 A1* | 9/2020 | Pratt | H04L 63/20 |
| 2020/0342272 A1 | 10/2020 | Lin et al. | |
| 2021/0152581 A1* | 5/2021 | Hen | H04L 63/1416 |
| 2021/0166083 A1 | 6/2021 | Zhang et al. | |
| 2021/0271932 A1 | 9/2021 | Yang et al. | |
| 2021/0405984 A1 | 12/2021 | Agarwal et al. | |
| 2022/0014560 A1* | 1/2022 | Crabtree | H04L 63/1433 |
| 2023/0412620 A1* | 12/2023 | Crabtree | H04L 41/145 |

OTHER PUBLICATIONS

Z. Liu et al., "Learning Efficient Convolutional Networks through Network Slimming," arXiv: 1708.06519v1 [cs.CV], Aug. 22, 2017, 10 pages.

S. Ahmad et al., "Unsupervised Real-Time Anomaly Detection for Streaming Data," Neurocomputing, Apr. 22, 2017, pp. 134-147.

Spark.apache.org, "Clustering-RDD-Based API," http://spark.apache.org/docs/latest/mllib-clustering.html, downloaded Jun. 27, 2019, 20 pages.

U.S. Appl. No. 17/067,908 filed in the name of Qiang Chen et al. on Oct. 12, 2020, and entitled "Method for Managing Artificial Intelligence Application, Device, and Program Product.".

* cited by examiner

COMPUTER-IMPLEMENTED METHOD, DEVICE, AND COMPUTER PROGRAM PRODUCT

RELATED APPLICATION(S)

The present application claims priority to Chinese Patent Application No. 202210061803.2, filed Jan. 19, 2022, and entitled "Computer-Implemented Method, Device, and Computer Program Product," which is incorporated by reference herein in its entirety.

FIELD

Embodiments of the present disclosure generally relate to the field of computers, and in particular, to a computer-implemented method, a device, and a computer program product.

BACKGROUND

When users interact with terminal devices (such as notebook computers and mobile devices), they usually exhibit inherent or similar behavior patterns. For example, a user, when typing on a keyboard or touching a screen, often exhibits a relatively fixed behavior pattern. Analysis on user behavior data can detect anomalous user behaviors, which can be conducive to applications such as user authentication. At present, some solutions have been proposed to perform anomaly detection of a user behavior based on user behavior data acquired by, for example, a sensor of a terminal device. It will be appreciated that there are limitations in both the storage capacity and the computing capacity of the terminal device. At this time, how to use the terminal device to detect anomalous user behavior has become an important area of research.

SUMMARY

In a first aspect of the present disclosure, a computer-implemented method is provided. The method includes: determining, based on a set of user behavior data over a first time period, a set of behavioral features for a user behavior over the first time period. The method further includes: determining, based on the set of behavioral features, a set of anomaly scores for the user behavior according to an anomaly detection model. The anomaly detection model is trained based on user behavior data over a second time period. The method further includes: updating a previously determined anomaly score threshold based on comparison of the determined set of anomaly scores with the anomaly score threshold. The anomaly score threshold is used for indicating whether the user behavior is anomalous.

In a second aspect of the present disclosure, there is provided an electronic device. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: determining, based on a set of user behavior data over a first time period, a set of behavioral features for a user behavior over the first time period. The actions further include: determining, based on the set of behavioral features, a set of anomaly scores for the user behavior according to an anomaly detection model. The anomaly detection model is trained based on user behavior data over a second time period. The actions further include: updating a previously determined anomaly score threshold based on comparison of the determined set of anomaly scores with the anomaly score threshold. The anomaly score threshold is used for indicating whether the user behavior is anomalous.

In a third aspect of the present disclosure, a computer program product is provided. The computer program product is tangibly stored on a computer-readable medium and includes machine-executable instructions. The machine-executable instructions, when executed by a machine, cause the machine to perform any step of the method according to the first aspect of the present disclosure.

It should be noted that this Summary is provided to introduce a selection of concepts in a simplified manner, which will be further described in the Detailed Description below. The Summary is neither intended to identify key features or major features of the present disclosure, nor intended to limit the scope of the present disclosure.

BRIEF DESCRIPTION OF THE DRAWINGS

By description of example embodiments of the present disclosure provided in more detail with reference to the accompanying drawings, the above and other objectives, features, and advantages of the present disclosure will become more apparent, in which.

Throughout the drawings, the same or similar reference numerals represent the same or similar elements.

DETAILED DESCRIPTION

Figure 1:
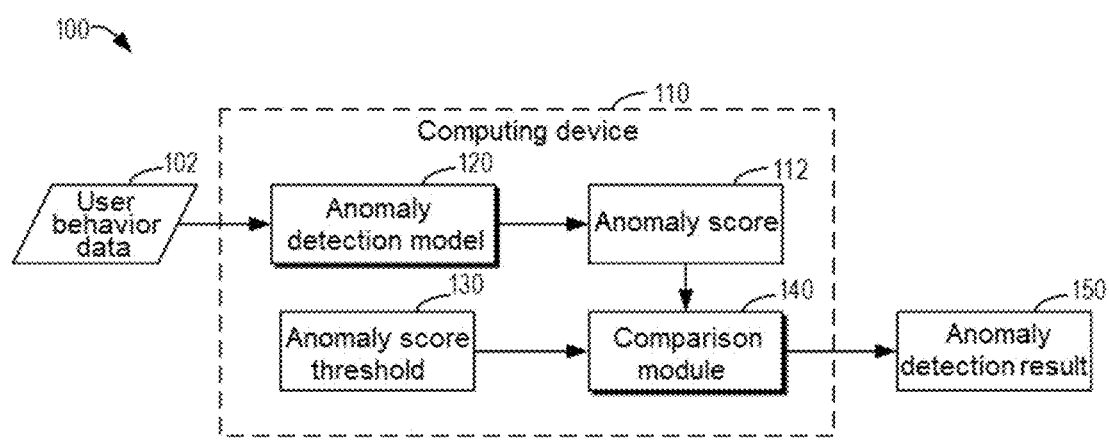
FIG. 1 shows a schematic diagram of an example environment in which embodiments of the present disclosure can be implemented.

The following will describe embodiments of the present disclosure in more detail with reference to the accompanying drawings. Although the drawings show certain embodiments of the present disclosure, it should be understood that the present disclosure can be implemented in various forms and should not be construed as limited by the embodiments described herein. Instead, these embodiments are provided to enable a more thorough and complete understanding of the present disclosure. It should be understood that the accompanying drawings and embodiments of the present disclosure are for exemplary purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." Relevant definitions of other terms will be given in the description below.

As used herein, the term "model" encompasses an arrangement configured to learn a correlation between corresponding inputs and outputs from training data, so that a corresponding output may be generated for a given input after the training is completed. The generation of a model may be based on machine learning technologies. Deep learning is a machine learning algorithm that uses multiple layers of processing units to process inputs and provide corresponding outputs. The neural network model is an example of a model based on deep learning. Herein, "model" may also be referred to as "machine learning model," "learning model," "machine learning network," or "learning network," and these terms are used interchangeably herein.

As described above, when users interact with terminal devices (such as notebook computers and mobile devices), they usually exhibit inherent or similar behavior patterns. Anomaly detection can be performed on a user behavior based on user behavior data acquired by, for example, a sensor of a terminal device. However, there are limitations in both the storage capacity and the computing capacity of the terminal device. On the one hand, user activities include a large amount of data about the user behavior, and the storage capacity and computing capacity of the terminal device make it difficult to process a large amount of user behavior data. Therefore, it is desirable to enable a terminal device with limited storage capability and computing capability to effectively analyze user behavior data.

On the other hand, for different applications, behaviors of the user may have different patterns. For example, when the user taps on a keyboard to write an email, a behavior pattern of keyboard tapping different from that when the user taps on the keyboard to play a game is generally shown. In addition, the behavioral pattern of the same user for the same application often varies over time. Therefore, it is expected to perform user behavior anomaly detection for different and time-varying user behavior patterns.

In some conventional user behavior anomaly detection solutions, static behavior fingerprints are usually used. That is, behavior data of the user is compared with static user behavior fingerprints to determine whether the user behavior is anomalous. However, this solution cannot adapt to different varying behavior patterns of users.

Several solutions have been proposed to retrain an anomaly detection model to adapt to varying behavior patterns of a user. However, these solutions are cumbersome and may be computationally intensive. Although terminal devices have made great progress in terms of computing capability (such as hardware) and intelligent algorithms (such as software), such solutions of continuously retraining an anomaly detection model still encounter many problems. For example, larger models are often not available in terminal devices due to hardware limitations. In addition, an anomaly detection model usually needs to run in real-time, and this continuous running in the background may quickly drain a battery of the terminal device. Furthermore, updating the anomaly detection model to adapt to variations of the behavior pattern is cumbersome.

To sum up, there is currently a lack of effective solutions for user behavior anomaly detection on a terminal device. According to embodiments of the present disclosure, a solution for user behavior anomaly detection is provided. In the solution, it is determined whether to update a previously determined anomaly score threshold based on comparison of a set of anomaly scores of a user behavior determined over a period of time with the anomaly score threshold. If it is determined that the anomaly score threshold needs to be updated, the solution utilizes a set of behavioral features of the user over the period of time to update the anomaly score threshold. By continuously triggering the update of the anomaly score threshold, the present solution can better adapt to varying behavior patterns of users. In addition, the present solution can also determine the anomaly score threshold for new user behavior patterns (e.g., behavior patterns for other applications).

In this way, the present solution can use a small model to detect anomalies in the user behaviors based on an adaptive anomaly score threshold. Further, this small model can be more battery friendly for the terminal device. In addition, the present solution can save computing resources and storage resources, and improve the overall performance of the terminal device.

The basic principles and several example implementations of the present disclosure are described below with reference to FIG. 1 to FIG. 8. It should be understood that these example embodiments are provided merely to enable those skilled in the art to better understand and then implement embodiments of the present disclosure, and are not intended to impose any limitation to the scope of the present disclosure.

FIG. 1 illustrates a schematic diagram of environment 100 in which embodiments of the present disclosure can be implemented. In environment 100 of FIG. 1, computing device 110 is configured to perform anomaly detection on user behavior data 102 to obtain anomaly detection result 150. Computing device 110 may include anomaly detection model 120 and comparison module 140. Anomaly detection model 120 may be a trained model. Anomaly detection model 120 is configured to determine anomaly score 112 for user behavior data 102 based on user behavior data 102. In some embodiments, computing device 110 further includes a feature extraction module (not shown). Computing device 110 may utilize the feature extraction module to extract a behavioral feature of user behavior data 102. Anomaly detection model 120 may determine anomaly score 112 based on the extracted behavioral feature.

In some embodiments, comparison module 140 may be a comparator. In some embodiments, comparison module 140 is configured to determine anomaly detection result 150 based on comparison of anomaly score 112 with anomaly score threshold 130. Anomaly score threshold 130 may be predetermined. Anomaly detection result 150 may indicate whether the user behavior is anomalous.

In some embodiments, computing device 110 may be configured to be communicatively coupled to various sensors (not shown), such as an accelerometer, a touch-sensitive sensor, and the like to acquire user behavior data 102. The various sensors may be included in computing device 110 or may be arranged separately from computing device 110. It should be understood that although only user behavior data 102 is shown in FIG. 1, this is by way of illustration only. Computing device 110 may receive a set of user behavior data, or a sequence of user behavior data. Computing device 110 may utilize anomaly detection model 120 to determine a set of anomaly scores for a set of user behavior data, and utilize comparison module 140 to determine a set of anomaly detection results.

In some embodiments, computing device 110 may be any device with a computing capability, for example, various terminal devices such as an Internet of Things (IoT) device. The terminal device may be any type of mobile terminals, fixed terminals, or portable terminals, including a mobile phone, a desktop computer, a laptop computer, a notebook computer, a netbook computer, a tablet computer, a media computer, a multimedia tablet, or any combination of the foregoing, including accessories and peripherals or any combination thereof, for these devices.

In some embodiments, anomaly detection model 120 may be an unsupervised, nonparametric learning model. Examples of anomaly detection model 120 include, but are not limited to: a K Nearest Neighbor (KNN) model, an isolation forest model, and the like. It should be understood that the example models listed above are only illustrative, not restrictive. Another suitable model may be used as anomaly detection model 120.

Anomaly detection model 120 described above is generally small and therefore more suitable for use in computing device 110 such as an IoT device. In this way, the computing resources of computing device 110 may be saved, thereby improving the overall performance of computing device 110.

It should be understood that although only one anomaly detection model 120 is shown in FIG. 1, this is merely illustrative. Computing device 110 may include any number of anomaly detection models 120. Computing device 110 may use different anomaly detection models for different types of user behaviors. In addition, computing device 110 may separately train various anomaly detection models, and respectively set different anomaly score thresholds for them. For example, different anomaly detection models and respective associated anomaly score thresholds may be set respectively for the type of behavior such as keyboard tapping and the type of behavior such as screen touching. For another example, different anomaly detection models and respective associated anomaly score thresholds may also be set respectively for the user tapping on a keyboard for writing an email and tapping on a keyboard for playing a game.

In this way, computing device 110 may utilize different anomaly detection models to perform anomaly detection for different types of user behaviors, respectively. In this way, it can better adapt to the various behavior patterns of users.

It should be understood that components and arrangements in the environment shown in FIG. 1 are only examples, and a computing device suitable for implementing the example embodiments described in the present disclosure may include one or more different components, other components, and/or different arrangements. Embodiments of the present disclosure are not limited in this regard.

Figure 2:
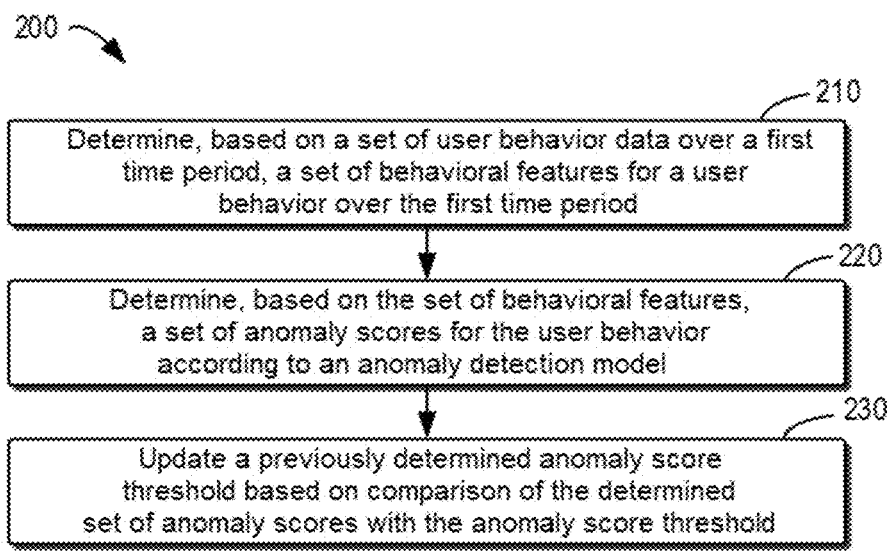
FIG. 2 shows a flow chart of a method for updating an anomaly score threshold according to some embodiments of the present disclosure.

Example embodiments providing user behavior anomaly detection will be described below with continued reference to the accompanying drawings. FIG. 2 shows a flow chart of example method 200 for updating an anomaly score threshold according to some embodiments of the present disclosure. Method 200 may be performed by, for example, computing device 110. It should be understood that method 200 may also include additional actions not shown. Method 200 is described in detail below with reference to FIG. 1.

At block 210, computing device 110 determines, based on a set of user behavior data over a first time period, a set of behavioral features for a user behavior over the first time period. Such behavioral features are also referred to herein as "behavior features." Herein, one or more behavior features of the user may also be referred to as a behavior fingerprint of the user. In some embodiments, the behavior feature may be a vector, a matrix, or any other suitable data form. The first time period may be a preset time length, such as 30 seconds. It should be understood that a numerical value described here is only illustrative and not intended to limit the scope of the present disclosure. In embodiments of the present disclosure, the first time period may be any suitable time length.

In some embodiments, the first time period may include a plurality of sampling time points. Computing device 110 may use a feature extraction module to extract behavior features from user behavior data at various sampling time points in the set of user behavior data.

Figure 3:
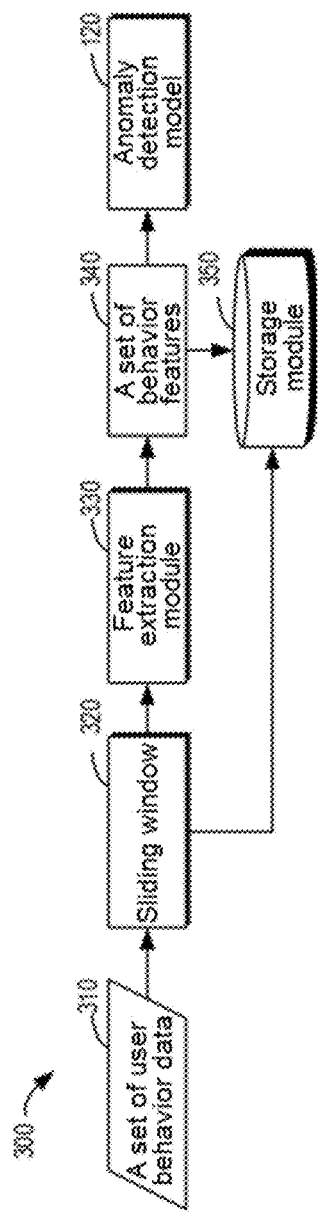
FIG. 3 shows a schematic diagram of an example architecture for determining a behavior feature of a user for anomaly detection according to some embodiments of the present disclosure.

Additionally or alternatively, in some embodiments, computing device 110 may perform windowing on the set of user behavior data at the various sampling time points, and extract behavior features for the windowed user behavior data. FIG. 3 shows a schematic diagram of example architecture 300 for determining a behavior feature of a user for anomaly detection according to some embodiments of the present disclosure.

As shown in FIG. 3, computing device 110 is configured to utilize sliding window 320 to process a set of user behavior data 310 obtained over a first time period. For example, for time point t(i) within the first time period (which may be represented as including time points t(i-n), . . . , t(i-1), and t(i), where i and n are any suitable natural numbers), sliding window 320 may be configured to perform sliding averaging on the user behavior data at time points t(i-3), t(i-2), t(i-1), and t(i). It should be understood that sliding window 320 described here is only illustrative and not intended to limit the scope of the present disclosure. Other suitable sliding windows may be used in embodiments of the present disclosure.

In some embodiments, computing device 110 may utilize storage module 350 to store at least one piece of current user behavior data for subsequent processing of next piece of user behavior data by sliding window 320. For example, at the time point t(i), storage module 350 may only store the user behavior data at time points t(i-3), t(i-2), t(i-1), and t(i), and user behavior data at other moments in the first time period is not stored. Alternatively, storage module 350 may store a set of user behavior data 310 in the first time period. In this way, storage resources of computing device 110 may be saved.

In some embodiments, sliding window 320 is used to perform windowing processing for each piece of user behavior data in a set of user behavior data 310. Each piece of user behavior data in the processed set of user behavior data is respectively input to feature extraction module 330 to obtain a set of behavior features 340. In some embodiments, feature extraction module 330 may be a function tailored for different applications. The function sampled by feature extraction module 330 may be designed by an experienced expert, or may be derived from historical reference values or empirical values. For example, different functions may be set for feature extraction for keyboard tapping and for screen touching. Feature extraction may be performed using any suitable function or model. The scope of the present disclosure is not limited in this regard.

Taking keyboard tapping behavior detection as an example, the behavior features for this behavior may include but are not limited to: a key-pressing event, a key-pressing time interval, and the like. For another example, in the type of behavior such as screen touching, the behavior features may include but are not limited to: a press intensity, a finger movement speed, and the like. It should be understood that the examples of keyboard tapping and screen touching listed above are merely examples and are not intended to limit the scope of the present disclosure. Embodiments of the present disclosure may be used for any suitable type of user behavior.

In some embodiments, a set of behavior features 340 may be separately input to anomaly detection model 120 for subsequent user behavior anomaly detection. Additionally or alternatively, the set of behavior features 340 may be stored in storage module 350 for subsequent use. In some embodiments, storage module 350 may also store only part of the behavior features in the set of behavior features 340, such as a predetermined number of latest behavior features.

By using the sliding window 320 and the feature extraction module 330, a sampling and saving strategy may be used for ensuring that the storage module 350 is constantly replenished with the latest user behavior data. In combination with anomaly detection model 120, adaptation to small behavior pattern drifts may be achieved.

The process of determining behavior features for user behavior anomaly detection has been described with reference to FIG. 3. It should be appreciated that any other suitable method or module may be used for determining behavior features based on user behavior data for anomaly detection.

Still referring to FIG. 2, at block 220, computing device 110 determines, based on the set of behavior features 340, a set of anomaly scores for the user behavior according to anomaly detection model 120. For example, computing device 110 may separately determine respective anomaly scores for various behavior features in the set of behavior features 340. Anomaly detection model 120 may be a trained model. For example, anomaly detection model 120 may be trained based on user behavior data over a second time period. The second time period is prior to the first time period. The second time period may partially coincide, or completely not coincide with the first time period.

Figure 4:
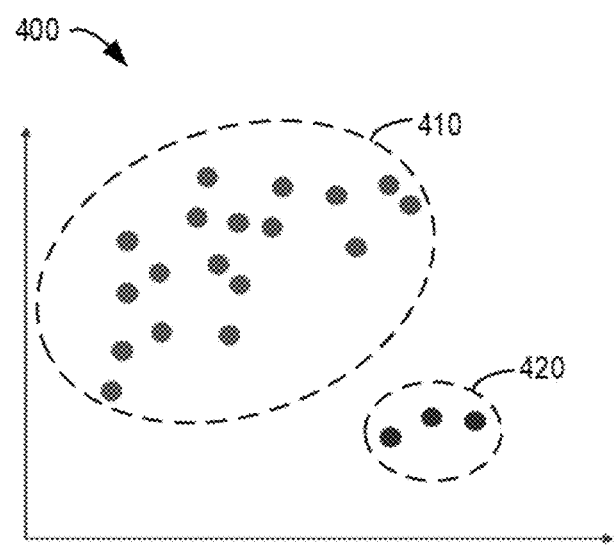
FIG. 4 shows a schematic diagram of a detection result of an anomaly detection model according to some embodiments of the present disclosure.

As described above, in some embodiments, anomaly detection model 120 may be an unsupervised, nonparametric learning model. Anomaly detection model 120 may not require label information of training data. Examples of anomaly detection model 120 include, but are not limited to: a K Nearest Neighbor (KNN) model, an isolation forest model, and the like. FIG. 4 shows a schematic diagram of detection result 400 of anomaly detection model 120 according to some embodiments of the present disclosure. In FIG. 4, training set 410 shows a plurality of behavior feature points for training during a training phase of anomaly detection model 120. Input feature set 420 may be a plurality of behavior feature points received during use of anomaly detection model 120.

In the example of FIG. 4, input feature set 420 is quite different from training set 410, and therefore, anomaly detection model 120 may output a relatively high anomaly score for input feature set 420. A relatively high anomaly score may indicate that the user behavior corresponding to input feature set 420 is relatively anomalous. In some embodiments, anomaly detection model 120 may output a relatively high anomaly score for each input feature in input feature set 420 to indicate that the user behavior is relatively anomalous.

It should be understood that, in some embodiments, a relatively low anomaly score may also be used for indicating that the user behavior is relatively anomalous. Herein, description is made by taking a relatively high anomaly score indicating that the user behavior is relatively anomalous as an example.

By using relatively small anomaly detection model 120 for anomaly detection of user behavior, it can better adapt to computing device 110 such as an IoT device. In this way, the computing resources of computing device 110 may be saved, thereby improving the overall performance of computing device 110.

In some embodiments, computing device 110 may determine whether user behavior is anomalous based on comparison of the anomaly score determined by anomaly detection model 120 with an anomaly score threshold. For example, if the anomaly score exceeds the anomaly score threshold, it indicates that the user behavior is anomalous. Conversely, if the anomaly score does not exceed the anomaly score threshold, it indicates that the user behavior is normal. In some embodiments, the anomaly score threshold may be predetermined and may be continuously updated. The process of updating the anomaly score threshold is described below with continued reference to FIG. 2.

At block 230, computing device 110 updates previously determined anomaly score threshold 130 based on comparison of the determined set of anomaly scores with anomaly score threshold 130. For example, computing device 110 updates anomaly score threshold 130 if the number of anomaly scores exceeding previously determined anomaly score threshold 130 in the set of anomaly scores exceeds a threshold number. For example, computing device 110 may update anomaly score threshold 130 based on a set of behavior features 340 corresponding to a set of user behavior data 310 over a first time period.

In contrast, computing device 110 will not update anomaly score threshold 130 if the number of anomaly scores exceeding previously determined anomaly score threshold 130 in the set of anomaly scores does not exceed a threshold number. The threshold number may be a pre-set suitable and appropriate number, which is not limited in the present disclosure in this regard. It should be understood that the threshold number may also be dynamically set. In addition, different threshold numbers may be set for different applications or different user behavior types.

In this way, the anomaly score threshold may be updated according to gradually changing behavior patterns or behavior features of the user. In particular, an effective behavior pattern of the user may be updated by the sliding the window to gradually offset the input. By appropriately setting the anomaly score threshold and the threshold number, computing device 110 may be made robust to occasional anomalous behavior. Furthermore, the adaptation of the anomaly detection model according to the present solution to user behavior is seamless and does not require offloading of sensitive information.

Additionally or alternatively, computing device 110 performs identity authentication on the user if it is determined that a first anomaly score in the set of anomaly scores exceeds anomaly score threshold 130. For example, if an anomaly score determined using a behavior feature corresponding to user behavior data at a first moment in the first time period exceeds anomaly score threshold 130, computing device 110 performs identity authentication on the user. For example, computing device 110 may prompt the user to enter a password. If the password entered by the user is correct, the user succeeds in the identity authentication. It should be understood that any appropriate identity authentication technique may be used to perform identity authentication on the user. The scope of the present disclosure is not limited herein.

In some embodiments, computing device 110 may update the anomaly score threshold if the user succeeds in the identity authentication. For example, computing device 110 may update anomaly score threshold 130 based on the set of behavior features 340 corresponding to the set of user behavior data 310 over a first time period. Alternatively, computing device 110 may update anomaly score threshold 130 based on behavior features determined over a period of time prior to the first time period.

In this way, the anomaly score threshold may be updated for changing behavior patterns or behavior features of the authenticated user. In some scenarios, for different applications, the behavior of the user will show different behavior features. For example, when the user focuses on entering numerals by tapping on a keyboard, the entering may be quick without a pause. For another example, when a user taps on a keyboard while listening to a web conference, the entering may be slow and many errors may occur. The same user may have many different behavior features at different times or for different tasks or applications. Therefore, in this way, the anomaly score threshold may be updated for the changed behavior features of the user under the premise of determining the identity of the user.

Additionally, in some embodiments, computing device 110 may also retrain anomaly detection model 120 to learn a new user behavior pattern if the user succeeds in the identity authentication. Alternatively, computing device 110 may also adopt another anomaly detection model to learn a new user behavior pattern of the user.

In this manner, an anomaly detection model may be retrained or an additional anomaly detection model may be trained for changed behavior patterns or behavior features of the authenticated user. For example, although the user taps on the keyboard both during writing an email and during playing a game, different behavior features are shown for different applications. Therefore, in this way, on the premise of determining the identity of the user, the anomaly detection model may be retrained or an additional anomaly detection model may be trained for the behavior features of the user that have changed.

Additionally or alternatively, computing device 110 may retrain anomaly detection model 120 if it is determined that a time interval between the first time period and the second time period exceeds a time interval threshold. In other words, computing device 110 may retrain anomaly detection model 120 if a time interval between a current time period and a time period in which anomaly detection model 120 is trained exceeds a time interval threshold. It should be understood that the time interval threshold may be set to any suitable time length and the scope of the present disclosure is not limited herein. It should be understood that the time interval threshold may also be dynamically set. In addition, different time interval thresholds may be set for different applications or different user behavior types.

User behavior patterns are constantly changing. For example, if a user types a lot recently, the speed of tapping on the keyboard may increase gradually. As another example, if a user has not typed for many days, the speed of tapping on the keyboard will decrease. Therefore, by retraining the anomaly detection model at regular intervals, it may better adapt to the changing behavior patterns or behavior features of the user. In this way, anomaly detection of user behavior will be more accurate.

The solution for performing of user behavior anomaly detection based on a constantly updated anomaly score threshold of the present disclosure is described above with reference to FIG. 2. The user behavior anomaly detection described in the present disclosure can continuously adapt to gradually changing behavior patterns of the user. In addition, the anomaly detection described in the present disclosure can also identify and learn new behavior patterns of the user. In addition, the solution of the present disclosure does not require a lot of manual participation, thus having a desirable user experience.

On the one hand, the present disclosure adopts a small anomaly detection model, which saves computing resources and storage resources. On the other hand, the solution of the present disclosure performs the analysis of user behavior data locally on the terminal device, which avoids data leakage, thereby ensuring the privacy and security of the user. A personalized and secure anomaly detection solution with learning ability is provided for the terminal device such as the IoT device. The anomaly detection model described in the present disclosure may also be integrated into a core module of the terminal device such as an identity detector or another application, for applications such as identity authentication.

Figure 5:
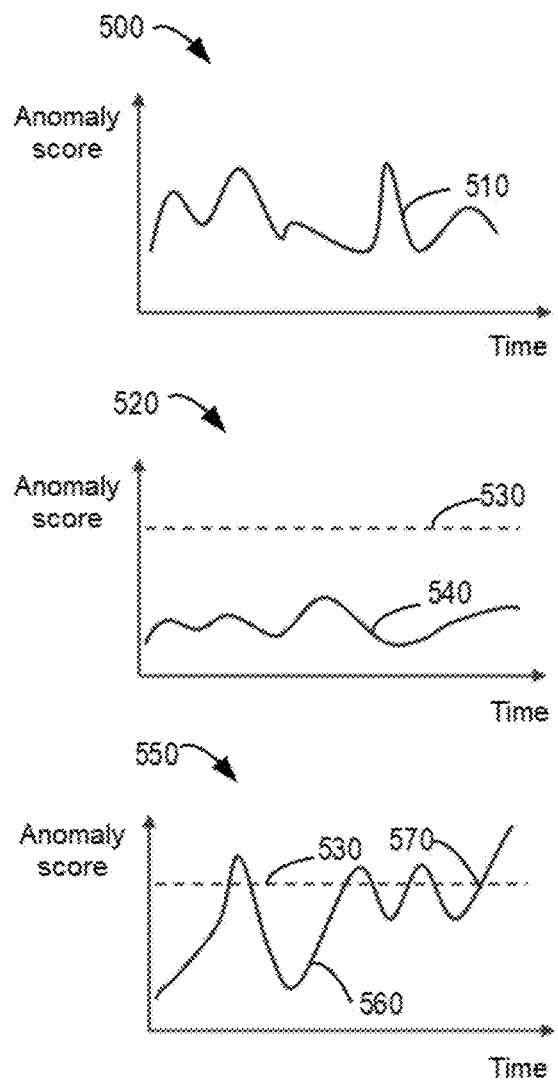
FIG. 5 shows several example graphs of anomaly scores according to some embodiments of the present disclosure.

FIG. 5 shows several example graphs of anomaly scores according to some embodiments of the present disclosure. Graph 500 shows anomaly score curve 510 for an initial training process of anomaly detection model 120. For example, anomaly detection model 120 has not been trained for a period of time when computing device 110 is first used. That is, anomaly detection model 120 is an empty model or a pre-trained model. In this initial learning phase, computing device 110 does not have a pre-set anomaly score threshold. Computing device 110 regards user behavior data over this period of time as normal. Computing device 110 utilizes anomaly score curve 510 to train anomaly detection model 120. In some embodiments, the training of anomaly detection model 120 may be completed by presetting the size of a training set or the length of a training period.

Graph 520 shows anomaly score curve 540 for user behavior anomaly detection using trained anomaly detection model 120 over a period of time. Anomaly score threshold 530 is also shown in graph 520. In the example of graph 520, anomaly score curve 540 has never exceeded anomaly score threshold 530. This indicates that the user behavior is always normal in this period of time.

Graph 550 shows anomaly score curve 560 for user behavior anomaly detection using trained anomaly detection model 120 over another period of time. Anomaly score threshold 530 is also shown in graph 550. In the example of graph 550, anomaly score curve 560 exceeds anomaly score threshold 530 multiple times. Anomaly score curve 560 exceeding anomaly score threshold 530 may be due to attempts to use computing device 110 by a non-authenticated user, or may be due to changing behavior patterns of an authenticated user.

In some embodiments, if the number of times of anomaly score curve 560 exceeding anomaly score threshold 530 is less than a threshold number over a period of time, e.g., only exceeding anomaly score threshold 530 once, the anomaly is likely due to a random behavior of the user. Computing device 110 will continue to perform anomaly detection of user behavior.

In contrast, if the number of times of anomaly score curve 560 exceeding anomaly score threshold 530 exceeds the threshold number over a period of time, computing device 110 may trigger an alarm. The alarm may notify the user that an anomalous user behavior has been detected. Additionally or alternatively, computing device 110 may authenticate the identity of the user if the number of times of anomaly score curve 560 exceeding anomaly score threshold 530 exceeds the threshold number. For example, computing device 110 may prompt the user to enter a password for identity authentication.

For example, if, at time point 570, the number of times of anomaly score curve 560 exceeding anomaly score threshold 530 exceeds the threshold number, computing device 110 prompts the user to enter a password. If the user succeeds in the authentication, computing device 110 may update anomaly score threshold 530 and may additionally retrain anomaly detection model 120.

Figure 6:
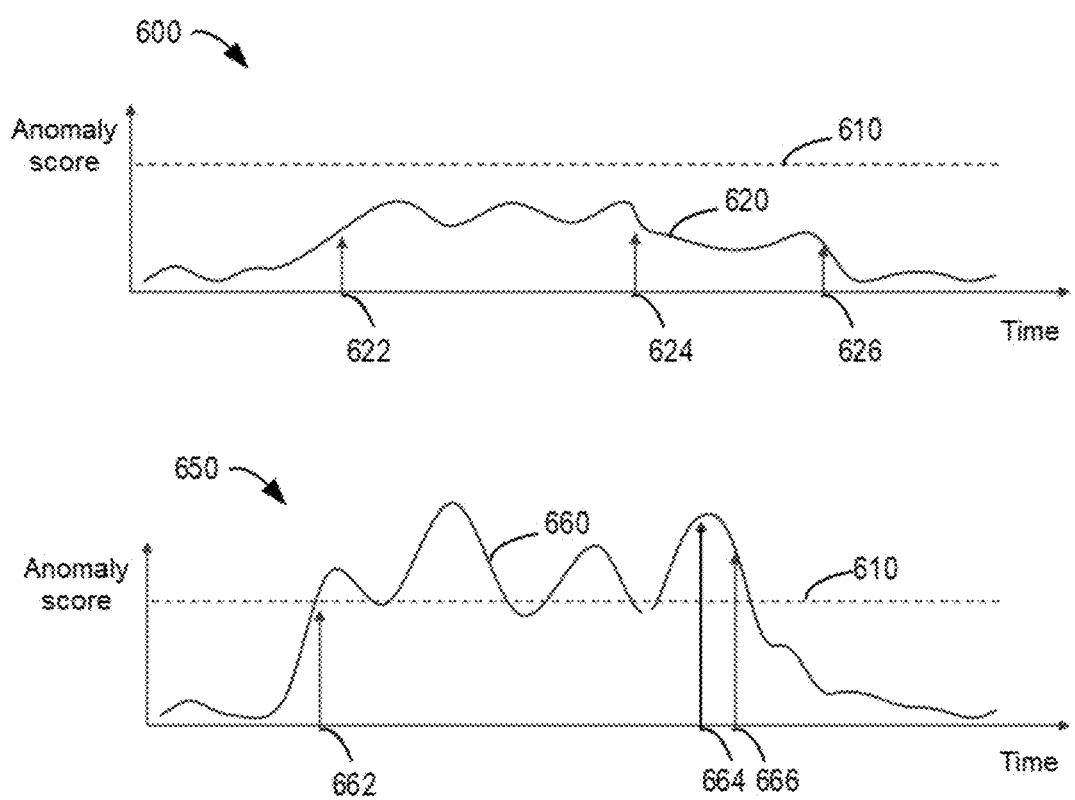
FIG. 6 shows additional example graphs of anomaly scores according to some embodiments of the present disclosure.

FIG. 6 shows additional example graphs of anomaly scores according to some embodiments of the present disclosure. Graph 600 shows anomaly score curve 620 and anomaly score threshold 610 for anomaly detection model 120 over a period of time. At time points 622, 624, and 626, computing device 110 may retrain anomaly detection model 120. Additionally, at time points 622, 624, and 626, computing device 110 may update anomaly score threshold 610.

In some embodiments, time points 622, 624, and 626 may be preset, or may be dynamically set based on the number of times the anomaly score exceeds anomaly score threshold 610. For example, in some embodiments, anomaly detection model 120 may be retrained and/or anomaly score threshold 610 may be updated at fixed time intervals (e.g., any time interval such as every day and every week).

For example, computing device 110 may retrain anomaly detection model 120 and/or update anomaly score threshold 610 by using user behavior data and behavior features stored in a storage device such as storage module 350 in FIG. 3. It should be understood that although anomaly score threshold 610 in FIG. 6 is shown as a straight line that does not change, in some embodiments, anomaly score threshold 610 may be continuously changing.

Graph 650 shows anomaly score curve 660 and anomaly score threshold 610 for anomaly detection model 120 over a period of time. As shown in the figure, at time point 662, anomaly score curve 660 exceeds anomaly score threshold 610. Subsequently, anomaly score curve 660 exceeds anomaly score threshold 610 multiple times. At time point 664, an anomalous number exceeding the threshold number is detected, and then at time point 664, computing device 110 triggers an alarm. The alarm may instruct the user, for example, to enter a password for identity authentication. If the user succeeds in the identity authentication at time point 666, computing device 110 may retrain anomaly detection model 120 and/or update anomaly score threshold 610 at time point 666.

Figure 7:
FIG. 7 shows a schematic diagram of an example result of a determined anomaly score curve according to some embodiments of the present disclosure.
Figure 7:
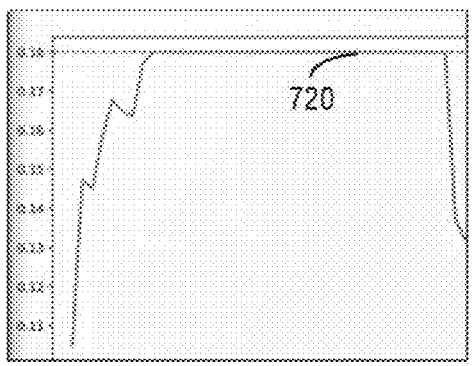

FIG. 7 shows a schematic diagram of an example result of a determined anomaly score curve according to some embodiments of the present disclosure. In the example of FIG. 7, a feature extraction function is used for extracting an average key-pressing time of frequent characters (e.g., E, T, and A) and intervals between key presses (e.g., an interval between E and N, an interval between A and N, and an interval between N and T). An eigenvalue may be determined as an average value of 30 keystroke events within a sliding window. Example eigenvalue results are shown in Tables 1 and 2, where Table 1 shows eigenvalues for a set of key-pressing times, and Table 2 shows eigenvalues for a set of key-pressing time intervals.

TABLE 1

| Key-pressing time (s) | | |
| --- | --- | --- |
| E | T | A |
| 0.127463 | 0.111602 | 0.135674 |
| 0.125904 | 0.108995 | 0.116216 |
| 0.140334 | 0.105325 | 0.116923 |
| 0.149159 | 0.104206 | 0.130560 |
| 0.125447 | 0.098812 | 0.130560 |

TABLE 2

| Key-pressing time interval | | |
| --- | --- | --- |
| E-N | A-N | N-T |
| 0.5000009 | 0.0 | 0.172395 |
| 0.5000009 | 0.0 | 0.172395 |
| 0.5000009 | 0.0 | 0.000000 |
| 0.5000009 | 0.0 | 0.000000 |
| 0 | 0.0 | 0.000000 |

It should be understood that although eigenvalues are shown for only 6 example keys and key combinations in Tables 1 and 2, namely, eigenvalues for 3 keys E, T and A and eigenvalues for 3 key combinations E-N, A-N and N-T, a larger number of eigenvalues or eigenvectors may be extracted for the keys and key combinations. In some embodiments, anomaly detection model 120 may be utilized to determine a set of anomaly scores based on several determined eigenvalues or eigenvectors. Result 710 shows the determined set of anomaly scores. Anomaly score curve 720 is drawn from result 710.

In anomaly score curve 720, computing device 110 determines that the anomaly score gradually increases over an initial period of time and stabilizes over a subsequent period of time. In response to this situation, computing device 110 may trigger retraining of anomaly detection model 120. Anomaly detection model 120 learns new behavior features of the user, and therefore, the anomaly score decreases to a normal value below the anomaly score threshold after anomaly detection model 120 is retrained (i.e., the end of anomaly score curve 720).

Figure 8:
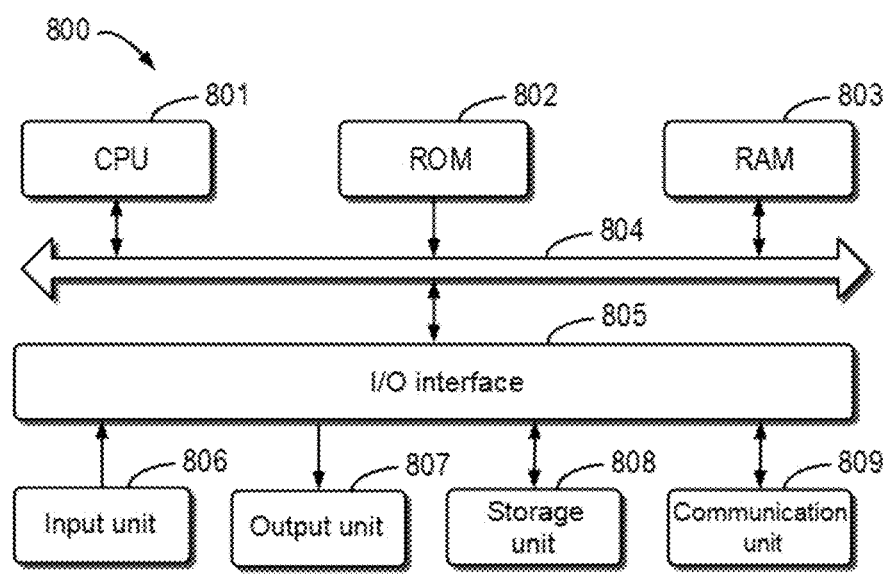
FIG. 8 shows a block diagram of a device that can be configured to implement embodiments of the present disclosure.

FIG. 8 shows a block diagram of device 800 that can be configured to implement embodiments of the present disclosure. Device 800 may be the device or apparatus described in embodiments of the present disclosure. As shown in FIG. 8, device 800 includes Central Processing Unit (CPU) 801, which may execute various appropriate actions and processing in accordance with computer program instructions stored in Read-Only Memory (ROM) 802 or computer program instructions loaded onto Random Access Memory (RAM) 803 from storage unit 808. Various programs and data required for the operation of device 800 may also be stored in RAM 803. CPU 801, ROM 802, and RAM 803 are connected to each other through bus 804. Input/Output (I/O) interface 805 is also connected to bus 804. Although not shown in FIG. 8, device 800 may also include a co-processor.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various methods or processes, such as method 200, described above may be performed by CPU 801. For example, in some embodiments, method 200 may be implemented as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps or actions of method 200 or processes described above may be executed. Alternatively, in other embodiments, CPU 801 may also be configured in any other suitable manner to implement the above processes/methods.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an Erasable Programmable Read-Only Memory (EPROM or flash memory), a Static Random Access Memory (SRAM), a portable Compact Disc Read-Only Memory (CD-ROM), a Digital Versatile Disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a Local Area Network (LAN) or a Wide Area Network (WAN), or can be connected to an external computer (for example, connected through the Internet using an Internet service provider). In some embodiments, an electronic circuit, such as a programmable logic circuit, a Field Programmable Gate Array (FPGA), or a Programmable Logic Array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in the reverse order, depending on the functions involved. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various embodiments of the present disclosure have been described above. The foregoing description is illustrative rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A computer-implemented method, comprising:
    determining, based on a set of user behavior data over a first time period, a set of behavioral features for a user behavior over the first time period;
    determining, based on the set of behavioral features, a set of anomaly scores for the user behavior according to an anomaly detection model, the anomaly detection model being trained based on user behavior data over a second time period; and
    updating a previously determined anomaly score threshold based on comparison of the determined set of anomaly scores with the anomaly score threshold, the anomaly score threshold being used for indicating whether the user behavior is anomalous;
    wherein a determination is made, based on one or more characteristics of one or more respective ones of the anomaly scores in the set of anomaly scores relative to the previously determined anomaly score threshold, to perform identity authentication on a user; and
    wherein updating of the previously determined anomaly score threshold is further based on a result of the identity authentication.

2. The method according to claim 1, wherein updating the anomaly score threshold comprises:
    updating the anomaly score threshold responsive to determining that the number of anomaly scores exceeding the previously determined anomaly score threshold in the set of anomaly scores exceeds a threshold number.

3. The method according to claim 1, further comprising:
    performing the identity authentication on the user responsive to determining that at least a first anomaly score in the set of anomaly scores exceeds the anomaly score threshold; and
    updating the anomaly score threshold if the user succeeds in the identity authentication.

4. The method according to claim 1, wherein updating the anomaly score threshold comprises:
    updating the anomaly score threshold based on the set of behavioral features.

5. The method according to claim 3, wherein if the user succeeds in the identity authentication, the method further comprises:
    retraining the anomaly detection model.

6. The method according to claim 1, further comprising:
    retraining the anomaly detection model responsive to determining that a time interval between the first time period and the second time period exceeds a time interval threshold.

7. The method according to claim 1, wherein the anomaly detection model comprises an unsupervised, nonparametric anomaly detection model.

8. The method according to claim 1, wherein the method is implemented at an Internet of Things (IoT) device.

9. An electronic device, comprising:
    at least one processor; and
    at least one memory storing computer program instructions, the at least one memory and the computer program instructions being configured together with the at least one processor to cause the electronic device to perform actions comprising:
    determining, based on a set of user behavior data over a first time period, a set of behavioral features for a user behavior over the first time period;
    determining, based on the set of behavioral features, a set of anomaly scores for the user behavior according to an anomaly detection model, the anomaly detection model being trained based on user behavior data over a second time period; and
    updating a previously determined anomaly score threshold based on comparison of the determined set of anomaly scores with the anomaly score threshold, the anomaly score threshold being used for indicating whether the user behavior is anomalous;
    wherein a determination is made, based on one or more characteristics of one or more respective ones of the anomaly scores in the set of anomaly scores relative to the previously determined anomaly score threshold, to perform identity authentication on a user; and
    wherein updating of the previously determined anomaly score threshold is further based on a result of the identity authentication.

10. The electronic device according to claim 9, wherein updating the anomaly score threshold comprises:
    updating the anomaly score threshold responsive to determining that the number of anomaly scores exceeding the previously determined anomaly score threshold in the set of anomaly scores exceeds a threshold number.

11. The electronic device according to claim 9, wherein the actions further comprise:
    performing the identity authentication on the user responsive to determining that at least a first anomaly score in the set of anomaly scores exceeds the anomaly score threshold; and
    updating the anomaly score threshold if the user succeeds in the identity authentication.

12. The electronic device according to claim 9, wherein updating the anomaly score threshold comprises:
    updating the anomaly score threshold based on the set of behavioral features.

13. The electronic device according to claim 11, wherein if the user succeeds in the identity authentication, the actions further comprise:
    retraining the anomaly detection model.

14. The electronic device according to claim 9, wherein the actions further comprise:
    retraining the anomaly detection model responsive to determining that a time interval between the first time period and the second time period exceeds a time interval threshold.

15. The electronic device according to claim 9, wherein the anomaly detection model comprises an unsupervised, nonparametric anomaly detection model.

16. The electronic device according to claim 9, wherein the actions are implemented at an Internet of Things (IoT) device.

17. A computer program product that is tangibly stored on a computer-readable medium and comprises machine-executable instructions, wherein the machine-executable instructions, when executed by a machine, cause the machine to perform a method, comprising:
- determining, based on a set of user behavior data over a first time period, a set of behavioral features for a user behavior over the first time period;
- determining, based on the set of behavioral features, a set of anomaly scores for the user behavior according to an anomaly detection model, the anomaly detection model being trained based on user behavior data over a second time period; and
- updating a previously determined anomaly score threshold based on comparison of the determined set of anomaly scores with the anomaly score threshold, the anomaly score threshold being used for indicating whether the user behavior is anomalous;
- wherein a determination is made, based on one or more characteristics of one or more respective ones of the anomaly scores in the set of anomaly scores relative to the previously determined anomaly score threshold, to perform identity authentication on a user; and
- wherein updating of the previously determined anomaly score threshold is further based on a result of the identity authentication.

18. The computer program product according to claim 17, wherein updating the anomaly score threshold comprises:
- updating the anomaly score threshold responsive to determining that the number of anomaly scores exceeding the previously determined anomaly score threshold in the set of anomaly scores exceeds a threshold number.

19. The computer program product according to claim 17, wherein the method performed by the machine further comprises:
- performing the identity authentication on the user responsive to determining that at least a first anomaly score in the set of anomaly scores exceeds the anomaly score threshold; and
- updating the anomaly score threshold if the user succeeds in the identity authentication.

20. The computer program product according to claim 17, wherein updating the anomaly score threshold comprises:
- updating the anomaly score threshold based on the set of behavioral features.

* * * * *